Patented May 13, 1924.

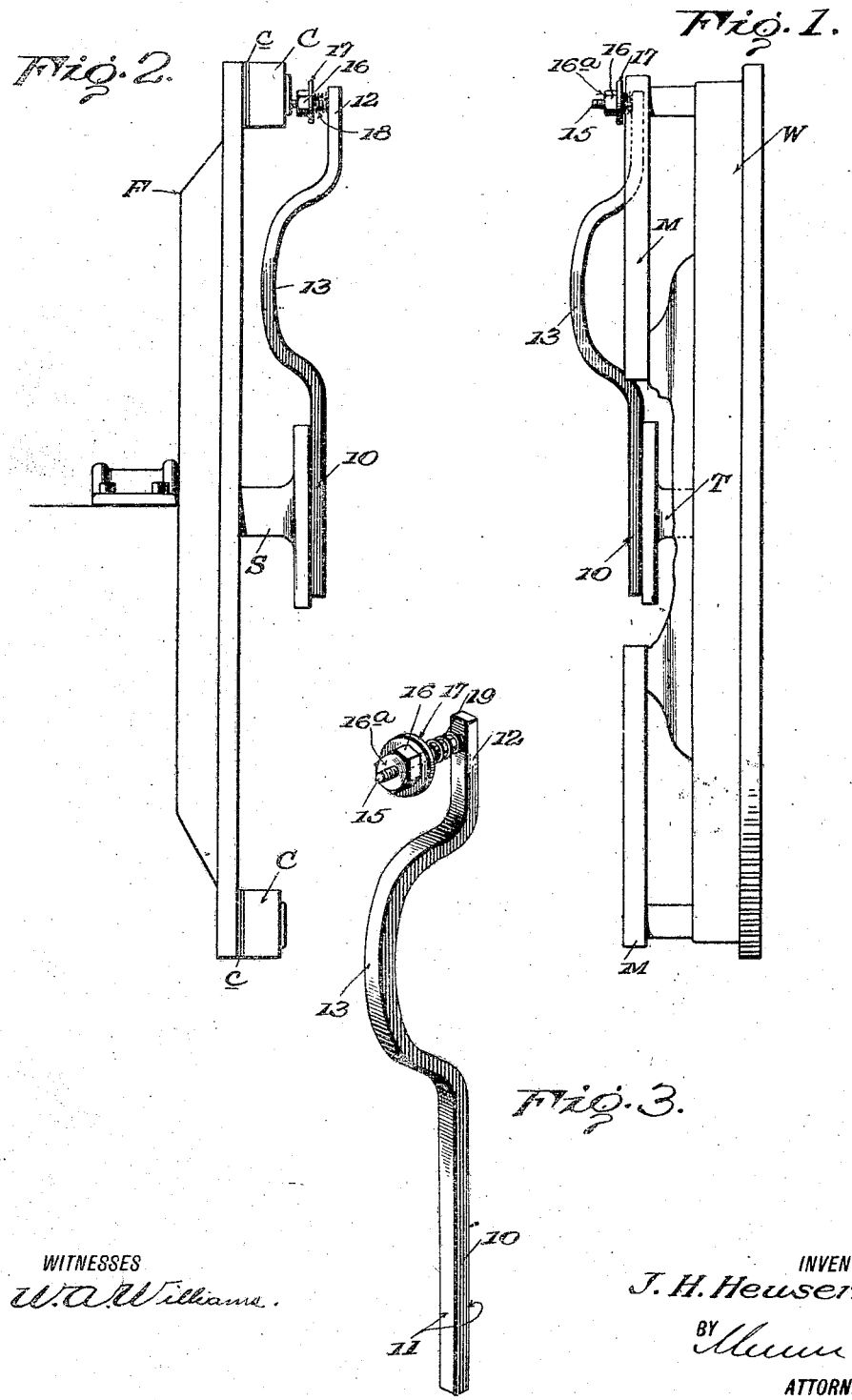

1,493,813

UNITED STATES PATENT OFFICE.

JOHN H. HEUSER, OF MORSE BLUFF, NEBRASKA.

MAGNETO ASSEMBLY GAUGE.

Application filed April 18, 1922. Serial No. 554,664.

*To all whom it may concern:*

Be it known that I, JOHN H. HEUSER, a citizen of the United States, and a resident of Morse Bluff, in the county of Saunders and State of Nebraska, have invented certain new and useful Improvements in Magneto Assembly Gauges, of which the following is a specification.

This invention relates to a magneto assembly gauge especially adapted for use with magnetos used with widely known types of automobiles.

Heretofore in the art in assembling the field coils and magnets utilized in a "Ford" magneto, it has been necessary to assemble and take down the magnets and field coils several times in order to bring about proper disposition and adjustment of these parts, it being necessary to take the field coils and magnets down in order to place shims where required, and it being practically impossible to determine where such shims are required until after the parts have been assembled. The repeated assembly and disassembly of the magnets and field coils obviously entails a great deal of labor and time and consequently a great deal of expense.

The object of the present invention is to provide a magneto assembly gauge which greatly facilitates the assembly of the field coils and magnets by virtue of the fact that when the gauge constituting the present invention is utilized the field coils and magnets may be adjusted to proper position and relation with respect to each other in one operation, the gauge indicating prior to the first assembly just where and how many shims are necessary so that the field coils and magnets may be properly mounted without the necessity of the successive assemblies and disassemblies above referred to.

Another object is to provide a magneto assembly gauge of this character which is of extremely simple and durable construction, reliable and accurate in use and susceptible of operation by a mechanic of ordinary intelligence and skill.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a fragmentary view in front elevation, showing the first step in the use of the gauge;

Figure 2 is a similar view, showing the second and final step in the use of the gauge; and Figure 3 is a perspective view, illustrating the construction of the gauge.

Referring to the drawings it will be seen that the invention is shown in conjunction with the "Ford" magneto assembly, the field coils of which are designated at C and are mounted as usual upon a stationary frame F. The revolving magnets M are mounted upon the fly wheel W, being clamped in position thereon by the usual magnet clamps or stayer plates. The fly wheel is carried by the transmission shaft T which is coupled with a crank shaft S in the usual manner. These parts are of the ordinary and conventional construction and need no description.

In assembling the magneto it is found necessary to place shims or the like, designated at c behind certain of the field coils C in order that the field coils will be properly spaced from the magnets. Usually the distance between the field coils and the magnets is $\frac{1}{32}$ of an inch but as to this distance it is customary for the skilled mechanic to utilize his judgment.

The gauge which constitutes the present invention is adapted to indicate without the necessity of assembling and disassembling the magnets of the field coils, just what field coils require shims so that the field coils may be properly shimmed before assembly. This gauge is constructed of a bar of brass or other metal of rectangular cross section, the bar being formed to include a section 10 having its opposite sides or faces 11 machined or ground to present plane surfaces adapted to snugly abut the end of the transmission shaft T or the end of the crank shaft S, for a purpose which will hereinafter be more fully described. The gauge also includes a second section or portion 12 alined with the section 10 and of the same cross section as the section 10, the sections 10 and 12 being connected by an intermediate offset section 13 which constitutes a handle and which also provides the requisite clearance between the sections 10 and 12, as will also be more fully described. A laterally extending threaded stem 15 is rigidly connected to the section 12 adjacent the outer end thereof and has threaded thereon a nut or adjustable abutment 16 engaged by a free washer 17 mounted for free movement on the threaded stem 15. A compression coil spring 18 is arranged on the stem 15 and abuts the section 12 of the bar at one end and the adjacent face of the washer at its opposite end, this coil spring serving to maintain the washer 17 snugly up against the adjacent face of the nut 16 thereby releasably locking the nut 16 in adjusted position on the threaded stem 15. The combined thicknesses of the nut 16 and the washer 17 equals the thickness of the bar from which the sections 10 and 12 are formed.

In assembling the magnets and field coils of a "Ford" magneto, the first step in the use of the gauge is to apply one of the surfaces 11 of the section 10 to the face of the transmission shaft T as shown in Figure 1 in such a manner that the section 12 lies in the space between the magnets M. When so positioned the section 10 constitutes a setting device or setting bar for the gauge and with the section 10 positioned as shown in Figure 1, the nut or adjustable abutment 16 is turned until the inner surface of the free washer 17 is disposed in the same plane as the magnet clamps or stayer plates at the outer ends of the magnets M. The portion 12 of the bar of which the gauge is made itself constitutes a carrier bar for properly carrying and positioning the threaded stem and associated parts. After this adjustment of the nuts 16 the gauge is transferred to the crank shaft and field coil assembly, as shown in Figure 1, at which time the opposite face 11 from that engaged with the transmission shaft T in Figure 2 is engaged with the end of the crank shaft S and with the gauge so positioned the outer surface of the nut, that is the surface designated at 16$^a$ in Figure 3 then lies in the plane in which the outer surfaces of the magnets will revolve when the magnets are assembled with the field coil. Since the gauge thus establishes where the magnets will lie, the field coil C may be properly positioned by placing the necessary number of shims behind the field coils to bring the field coils into proper spaced relation with respect to the magnets. It is to be noted that the thickness of the free washer 17 and the adjustable abutment 16 being equal to the thickness of the bar comprising the sections 10 and 12 compensates for the distance lost by the reversal of the bar. In this manner the field coils of the magnets may be properly assembled without assembling or disassembling the magneto a number of times.

It is obvious that the nut 16 and washer 17 constitute the adjustable gauging element in the present embodiment of the invention. However the washer 17 and spring 18 together coact to releasably hold the nut 16 in adjusted position and this is the primary purpose of the washer. Should it be found desirable to omit the means for holding the nut in adjusted position that is omit the washer 17 and spring 18, then of course the nut 16 would itself be made of sufficient thickness to compensate for the distance lost by the reversal of the bar and operation of the gauge above described.

I claim:

1. In a gauge of the character described, a bar comprising a setting section, a carrier section, and an offset connection between said setting and said carrier sections, a threaded stem having one end rigidly secured to the carrier section, an adjusting nut engaged with said threaded stem, a washer loosely mounted on the threaded stem and controlled by said adjusting nut the combined thickness of the nut and the washer being equal to the thickness of the setting section and a coil spring arranged on the threaded stem and engaging the carrier section at one end and the washer at its opposite end.

2. In a gauge of the character described, a bar comprising a setting section, a carrier section and an offset connection between said setting and said carrier sections, a threaded stem having one end rigidly secured to the carrier section, an adjustable gaging element including a nut operatively engaged with the threaded stem, the thickness of the adjustable gaging element being equal to the thickness of the setting section and means for releasably holding the nut in adjusted position on said stem.

3. In a gauge of the character described, a bar comprising a setting section, a carrier section and an offset connection between said setting and said carrier sections, a threaded stem having one end rigidly secured to the carrier section, and an adjustable gaging element including a nut operatively engaged with the threaded stem, the thickness of the adjustable gaging element being equal to the thickness of the setting section.

4. In a gauge of the character described, a bar comprising a setting section, a carrier section, an offset connection between said setting and said carrier sections and an adjustable gauging element mounted on said carrier section, the thickness of the adjustable gaging element being equal to the thickness of the setting section.

5. In a gauge of the character described, a bar comprising a setting section, a carrier section, an offset connection between said setting and said carrier section and an adjustable gauging element mounted on said carrier section, the thickness of the adjustable gaging element being equal to the thickness of the setting section, and means for releasably holding the gauging element in adjusted position.

6. A gauge for use in assembling the field coils and magnets of a magneto comprising a bar having a setting section provided with parallel plane faces adapted to successively coact respectfully with the transmission shaft and the crank shaft of the engine, said bar also having a carrier section alining with the setting section and connected thereto, and an adjustable gauging element mounted on the carrier section, the thickness of the adjustable gaging element being equal to the thickness of the setting section the gauging element being adjusted to indicate the positions of the magnets when the proper plane face of the setting section is engaged with the transmission shaft so that when the other plane face of the setting section is engaged with the crank shaft the position of the magnets relative to the field coils will be indicated.

7. In a gauge of the character described, a reversible setting bar and an adjustable gauging element having a thickness corresponding to the thickness of the setting bar whereby to compensate for the distance lost in the reversal of said bar.

JOHN H. HEUSER.